United States Patent [19]
Jurkevich

[11] Patent Number: 5,295,133
[45] Date of Patent: Mar. 15, 1994

[54] SYSTEM ADMINISTRATION IN A FLAT DISTRIBUTED PACKET SWITCH ARCHITECTURE

[75] Inventor: Mark Jurkevich, Burtonsville, Md.

[73] Assignee: Sprint International Communications Corp., Reston, Va.

[21] Appl. No.: 834,213

[22] Filed: Feb. 12, 1992

[51] Int. Cl.$^5$ .................. H04J 3/14; H04L 12/56
[52] U.S. Cl. ..................... 370/16; 370/60; 370/94.1; 371/8.2; 371/11.2
[58] Field of Search ............. 370/13, 14, 16, 16.1, 370/54, 58.1, 58.2, 58.3, 60, 60.1, 85.6, 85.7, 85.8, 94.1; 340/826, 827; 379/219, 220, 221, 268, 269, 270, 271, 272, 293, 279; 371/8.1, 8.2, 9.1, 11.1, 11.2, 11.3

[56] References Cited

U.S. PATENT DOCUMENTS

| | | | |
|---|---|---|---|
| 4,713,806 | 12/1987 | Oberlander et al. | 370/60 |
| 4,763,329 | 8/1988 | Green | 370/16 |
| 4,823,111 | 4/1989 | Tsuchiya et al. | 370/16 |
| 5,040,171 | 8/1991 | Osaki | 370/60 |
| 5,105,420 | 4/1992 | Ardon et al. | 370/16 |
| 5,115,425 | 5/1992 | Ardon | 370/54 |

Primary Examiner—Douglas W. Olms
Assistant Examiner—Alpus H. Hsu
Attorney, Agent, or Firm—Wigman, Cohen, Leitner & Myers

[57] ABSTRACT

A packet switch with a plurality of processing modules (PMs) interconnected via a shared transmission medium is provided with a flat distributed architecture by which each of the PMs has the capability of exclusive control of establishing a path for a user connection through the switch when a call request (CR) packet is received at one of its input transmission lines to the switch, and in which the exclusive control is exercised by selecting the best available output transmission line among all of the output transmission lines from the switch whether that output transmission line is one of its own or one of those of another PM in the switch, so that the path for the user call connection through the switch established in response to a given CR packet at any given time is a single hop via the shared transmission medium between the source PM which established the path and the destination PM which has the selected output transmission line, except where a single PM is both the source and the destination PM because its own output transmission line is selected as the best currently available choice. System administration within the switch, including tasks such as software loading, redundancy establishment, switch reconfiguration, statistics collection and alarm reporting to the network management system, is performed by one or more of the PMs selected upon switch initialization according to programmed criteria including PM address.

14 Claims, 5 Drawing Sheets

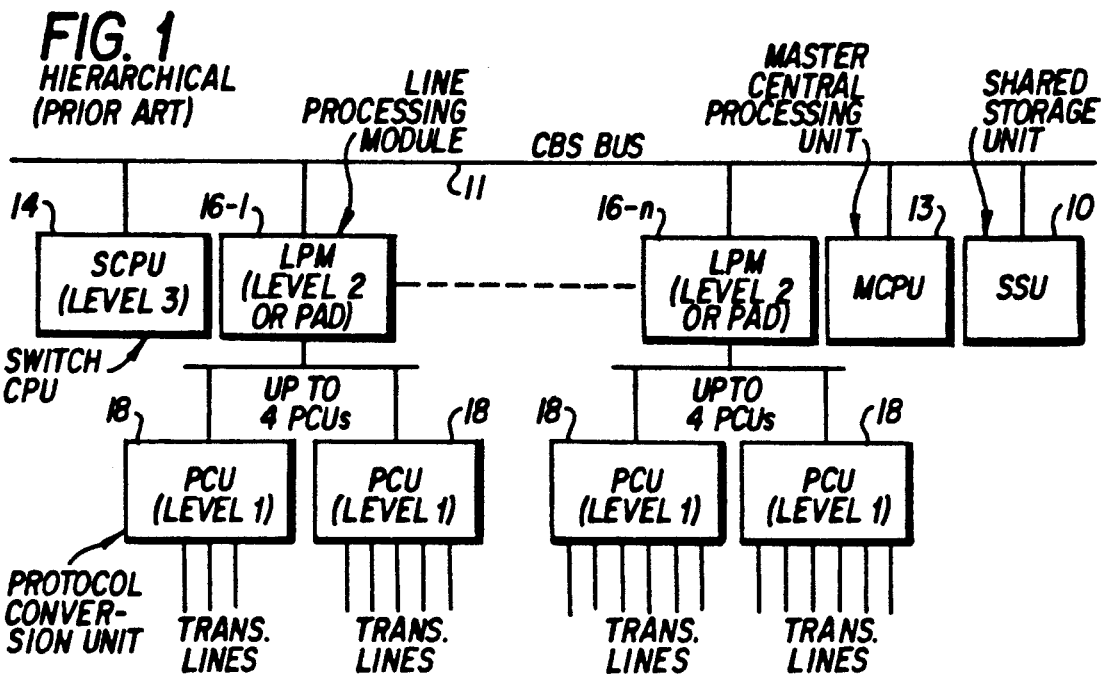
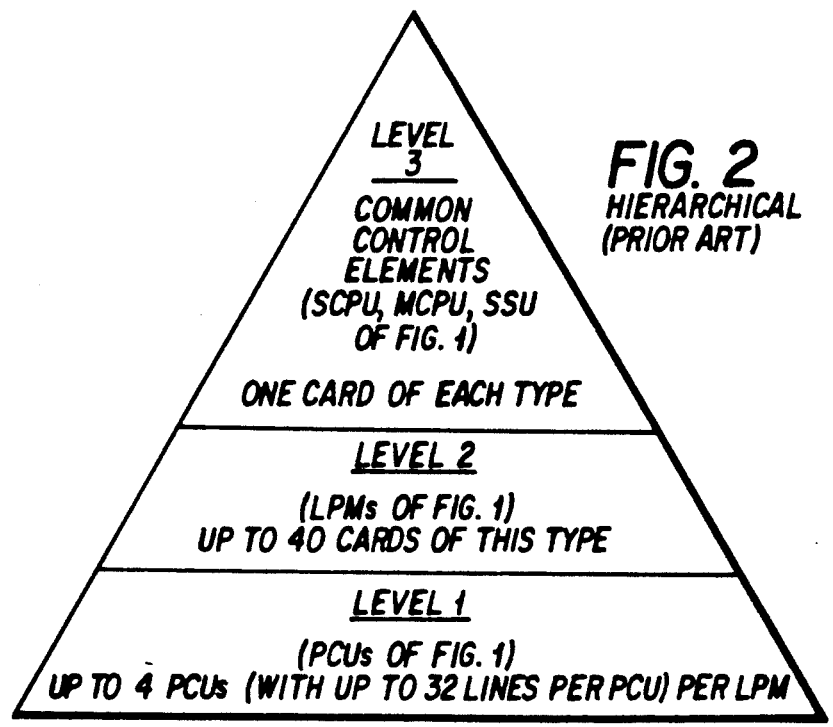

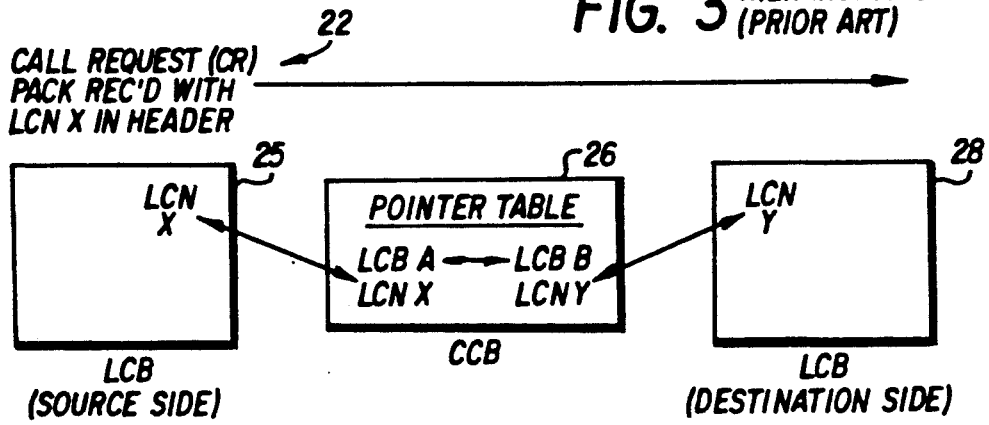
FIG. 3 HIERARCHICAL (PRIOR ART)
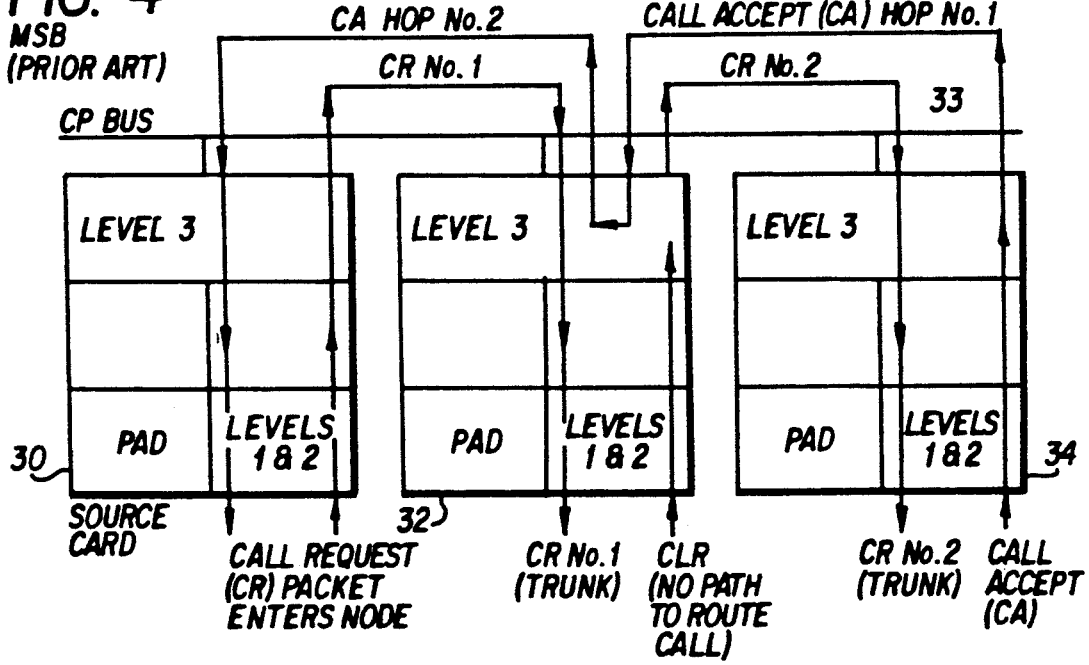
FIG. 4 MSB (PRIOR ART)
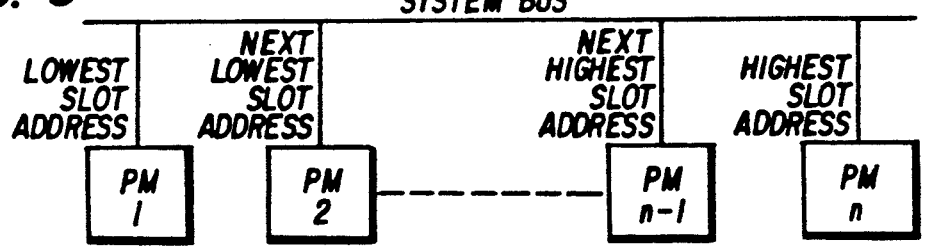
FIG. 9

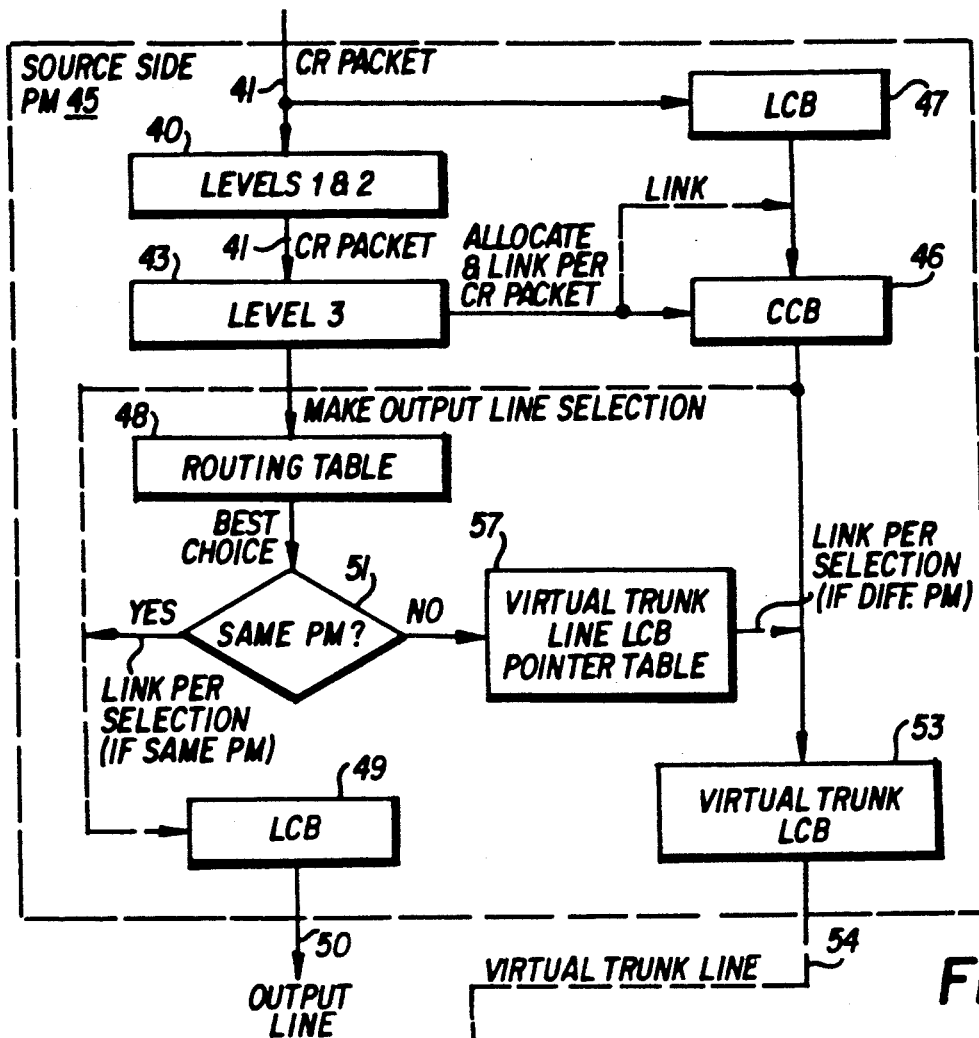
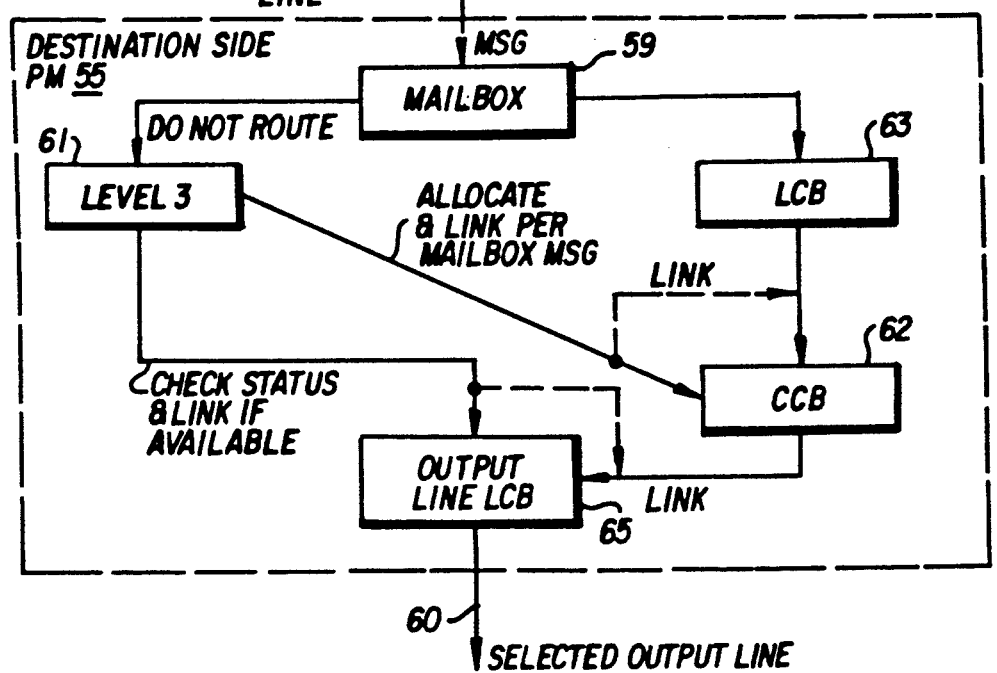
FIG. 6

SYSTEM ADMINISTRATION IN A FLAT DISTRIBUTED PACKET SWITCH ARCHITECTURE

CROSS-REFERENCE TO RELATED APPLICATION

This application is related to the copending application titled "Connection Establishment in a Flat Distributed Packet Switch Architecture", Ser. No. 07/834,209, of the same inventor and assigned to the same assignee as the instant application, filed on even date herewith.

BACKGROUND OF THE INVENTION

The present invention relates generally to digital communication schemes, and more particularly to improvements in packet switching networks and systems.

Distributed packet switching architectures have been used for many years, since the advent of the microprocessor, and are essentially multi-microprocessor based systems in which a specific subset of system functions is assigned to each processor. The processors are interconnected by a bus over which they communicate and exchange status and user information for further processing or transmission by other processors. The classical packet switching architecture is hierarchical, and is used by virtually every packet switch other than desktop concentrators/network access devices.

In the architecture of the system, user traffic handling functions are distributed over the microprocessors according to the International Standards Organization's (ISO's) seven-layer (level) open system interconnection (OSI) protocol model, in which packet switches and networks implement the first three and in some instances the fourth layer, while the remaining layers are implemented in subscriber devices, such as computers or other terminals. In the ISO/OSI model, the first layer in the packet switch is the physical layer, which converts packets to and from the transmission medium-specific signals of the link (which may be microwave, copper, fiber optic, satellite, and/or other transmission facility) for transmission and reception over the link. In essence, this is the level that moves 1's and 0's across a transmission line. Level 2 is the link layer, which is responsible for transmitting and receiving complete and error-free packets across a link for the network layer. This second level handles the framing of packets on a per-link (line) basis, and maintains responsibility for successful receipt and transmission of packets across the link.

The third level is the network switching layer (packet level/switch level), which manages the user connection path through the network and routes packets containing user information over the path by looking inside each packet and then finding the correct output line. A path consists of one or more switches (nodes) connected by transmission links. Level 3 operates not on a per line basis, but through an understanding of the entire system.

The fourth level is the transport layer, which is the end to end network protocol, typically performed by a packet assembler/disassembler (PAD). Level 4 functions are used within the network only when the subscribers to be connected to the network communicate using a protocol different from the network's level 3 protocol. Level 4 functions are present only at points of entry and exit of the network, and primarily provide end to end network control and protocol conversion to the level 3 protocol for network transport.

The ISO/OSI seven-layer model is a classification scheme, but with advances in technology it has tended to be confused in a marketing sense with the technology itself. That is, because the first layer is extremely fast and is performed principally in hardware, and the second layer is also very fast, and the third layer is somewhat slower and more complex, the view in many quarters has become that these lower layers should be associated with speed and layer 1 with the hardware itself. The higher the number of the layer, the more complex and time consuming are the functions. The advent of extremely complex and high performance silicon chip technology has blunted this view, to some extent, permitting implementation of higher layer functions completely with hardware. It would appear to become more difficult, then, to maintain a view that hardware is restricted to level 1. But with increased sophistication of the technology and greater implementation in high speed integrated circuitry hardware, creative marketing approaches have led to assertions that formerly higher level ISO/OSI functions are now being performed in a lower layer in the product being marketed. In reality, of course, the ISO/OSI protocol was not intended to refer to specific technology, but merely to classification of universally required functions of the decision making process of transmitting user data through a network, regardless of whether the routing itself is accomplished in hardware, or in software, or by hierarchical or other processes.

The hierarchical architecture consists of a single level 3 processor which is capable of supporting several, even many, level 2 processors, each of which in turn is capable of supporting several/many level 1 processors. Level 3 contains the intelligence for making the packet routing decision, i.e., a particular packet is associated with a particular call and came in on a particular line and therefore it must go out on a specific line. In the hierarchical architecture, if several different entities were permitted to be involved simultaneously in this decision-making process the conflicts could be catastrophic. One level 3 processor might, for example, command that a connection should be torn down (disconnected) because of excessive traffic on a link, while another commanded that the same connection remain set up. The existence of only one arbiter of connection management, and only one system administrator, each of which is a "common control element", has been deemed a principal advantage of the hierarchical architecture.

A popular hierarchical architecture, multi-microprocessor based packet switch is the Sprint International Communications Corporation (formerly Telenet Communications Corporation) TP 4900, shown in highly simplified block diagrammatic form in FIG. 1. The packet switch includes a plurality of components implemented in integrated circuit module, board or card form, typically housed in a structure referred to as a cage. The cards are the functional elements of the architecture, and are interconnected by bus systems. Cards are inserted into slots to mate with connectors in the cage, and the bus and other cabling traverse the rear of the cage for intra- and inter-cage communications. A mailbox scheme is employed to synchronize interprocessor communications. One of the cards, a shared storage unit (SSU) 10, constitutes a global memory and is connected to the central bus system (CBS) bus 11. A portion of the global memory is reserved for each microprocessor card, and is subdivided into outgoing and incoming messages. The master central processing unit (MCPU) card 13 is the system administrator dedicated to control of system level activities, including responsibility for moving and routing outgoing messages to the incoming mailbox of the microprocessor card identified by an address in the header of the respective message.

A switch CPU (SCPU) 14 is the level 3 processor in the packet switch architecture of FIG. 1 and, like each of MCPU 13 and SSU 10, is a common control element (to be discussed in more detail presently). A plurality of line processing modules (LPMs) 16-1 through 16-n provide level 2 processing, with up to forty LPM slots available in the TP4900 switch (limited, however, by actual configuration and traffic). Each LPM is capable of supporting up to four protocol conversion units (PCUs) 18 which are connected to various transmission lines and provide level 1 processing for up to thirty-two physical transmission links.

The multi-microprocessor based architecture of the packet switch of FIG. 1 is a hierarchical distribution of functions as illustrated in FIG. 2. At the bottom of the hierarchy or pyramid are the level 1 PCU cards, with several supported by a single LPM level 2 card. At the top of the hierarchy are the common control elements (SSU 10, MCPU 13 and SCPU 14, in this example), so called because they are common to all traffic and the failure of any one of them will cause the entire packet switch to fail. In contrast, the failure of any of the other cards in the switch of FIG. 1 would cause only a loss of traffic passing through that card. Here, the SCPU performs all connection management, and the MCPU is the system administrator. The SSU, as noted earlier herein, is a memory board shared storage unit.

System configuration flexibility is achieved in this architecture by adding more processors which support the required layer, such as by adding level 1 (PCU) cards when more transmission lines are configured, and a level 2 (LPM) card if the current level 2 cards are configured to maximum capacity. Growth potential is restricted, however, depending on traffic types and configurations required. This restriction exists at least because of the following four factors, which are not necessarily listed in order of importance. First, the amount of memory available on the global memory card limits the number of mailboxes, routing information, and other control information that can be stored to describe a configuration. Second, the global memory speed limits the number of processors that can effectively access their mailboxes under sustained traffic loads. Third, the level 3 processor used for switching packets from an input level 2 processor to an output level 2 processor is capable of supporting only a finite number of line processors, and as explained previously, it is not possible to have more than one level 3 processor for this task in a hierarchical architecture. Fourth, the bus length and speed create further limitations, but always secondary to those mentioned above. It is noteworthy that all of these restrictions are directly or indirectly associated with a common logic element.

The third layer of the ISO/OSI, the switching level, is of particular interest in the present invention. The first and second layers either receive a packet or are given a packet to transmit, without being required to know its origin or destination. In contrast, the third layer is an intelligent layer that recognizes the received packet, associates it with a particular connection, a particular source and a particular destination, to perform call set up and routing.

Another, less frequently encountered architecture may be characterized as "multiple switches in a box", or, more simply herein, as MSB. The MSB architecture actually uses many small hierarchical switches inside one "skin", or cage. It effectively puts all of the ISO/OSI level 1, level 2, and level 3 functions on each card, so that each acts as an autonomous, self-contained system, but located in the same "box", device or environment with the others. The switches are co-located and connected by a bus or by transmission lines. If the switches are in sufficiently close proximity, the transmission line may be an RS232 cable; whereas if they are separated by a vast distance the transmission line may be a toll line (fiber optic, microwave, or other) and a pair of modems. The MSB architecture is advantageous, for example, where a small desktop system is desired to have a larger system capability (expandability); but is disadvantageous because of its lower efficiency in network management and traffic handling operations.

By substituting a bus, a shared medium, for RS232 cabling in the MSB system, internal transmission speed is increased (megabits per second versus kilobits per second), and spaghetti-like cabling is eliminated. Despite some advantages over the strict hierarchical architecture, the MSB architecture only optimizes level 1, leaving level 3, and sometimes level 2, intact. Each card is now a separate switch and, in a network, if one fails, the other switches and the network control center ultimately determine where the failure occurred and how to circumvent it. The MSB system is neither as fast nor as efficient in these respects as the hierarchical architecture, which uses a separate system administration card—the MCPU in the aforementioned TP4900 packet switch—responsible for, among other things, monitoring the entire system and immediately identifying the location of a failure, followed by switchover from the failed card to a backup card.

The MSB architecture is a flat architecture, not hierarchical. If any card fails, the reaction and response is the same as if a node were lost in a network. In that circumstance, failure of the entire MSB device/switch is avoided because each card contains the intelligence to route around the problem. Within the switch, if enough redundant lines have been configured, the loss of one card will not adversely impact the remaining cards, except for the traffic that was passing through the failed card. One reason for referring to the MSB architecture as a flat architecture is that every element (i.e., switch comprising a card or group of cards acting as a single module) is capable of performing every function, in contrast to the element specialization of hierarchical architecture where, if one element fails, none other (apart from a backup) can perform its function. In addition to that inefficiency, each common control element of the hierarchical architecture can support only a finite number of entities, thus limiting expandability. In contrast, each element of the MSB architecture is a completely autonomous entity which, rather than needing to report to an MCPU or other element for interfacing with a network control center (i.e., network management system or NMS), interfaces directly with the NMS. However, this capability limits the size of a network that can be built with MSB switches, because as the network grows, the number of entities communicating with the NMS can overwhelm it. Also, in the MSB architecture, routing complexity grows considerably with each additional node, with concomitant problems in network administration and connection management—e.g., more switches to manage, each generating more network traffic and more network overhead. For these reasons, the MSB architecture is truly acceptable for only relatively simple or small networks.

In the hierarchical architecture, catastrophic failures are caused by common control element failure. Hidden performance limitations also exist in the architecture in that the switching is performed by a level 3 processor, such as the SSU, so that all of the traffic—every single packet through the system—must be deposited into the SSU, and must be processed by the SCPU. Eventually, these common control elements are unable to support any more lines.

Another drawback of the hierarchical architecture is its engineering and configuration complexity. For example, the maximum number of packets which can be processed is somewhat unpredictable, being dependent on the type of traffic driven through level 2 and other considerations. This imposes a significant degree of sophistication on the system, such as merely to determine whether the addition of another level 2 processor will increase total thoughput of the switch (e.g., the system may be level 3 bound, or level 2 bound, depending on the traffic mix).

A further disadvantage of the hierarchical architecture is the relatively high cost of the first port, which makes the architecture less competitive from a cost standpoint for small configurations. All of the common control elements necessary to support a large number of lines (for example, 96) are required even if considerably fewer lines (e.g., three) are being used at a particular site. In contrast, a single element desktop system is available with the MSB architecture for efficient and cost effective handling of up to eight lines, but subject to the MSB disadvantages noted above In the hierarchical architecture, one processor card set performs the high speed processing in levels 1 and 2 of the input line. Time intensive processing associated with switching and routing is performed in level 3 of a second processor card, and in levels 1 and 2 of the output line on a third processor card set. Because the traffic must pass through three separate processor card sets, the interprocessor communication requires additional processing overhead.

It is instructive to examine the similarities and differences in connection management in the hierarchical distributed and MSB flat architectures. The data structures used by both architectures for connection management include (i) line control block (LCB), call control block (CCB), and routing table. An LCB, which contains line control information such as line status (available/down), and logical channel number (LCN) availability/assignment, is allocated at initialization time for each transmission line connected to the packet switch. The LCB describes the characteristics of a transmission line and contains the line ID. More importantly, it provides a logic channel map. In packet switched networks, a connection is defined by logical channels. All packets bearing a particular logical channel number are associated with the connection, and that LCN is used to perform routing and switching. If the packet arrives on a certain input line with a particular LCN, it must be transmitted to a specific output line with an identified LCN. This is the nature of the switching process.

A CCB is allocated by level 3 process (processes in MSB architecture) during call establishment, and is deallocated during call clearing. The CCB contains connection control information providing a pointer to the source side LCB and LCN, and a pointer to the destination side LCB and LCN. Here, the terms "source" and "destination" merely identify the direction of the call request packet through the network. In fact, the source and destination sides are symmetrical in that packets from the source side are switched to the destination side, and vice versa, so that for any given packet, either side can be the input side and the opposite side is then the output side. One routing table is loaded into the switch at initialization time, the table containing an entry for each network address. An entry contains one or more lines over which the switch can route calls/packets for the given destination address. These are basic general data structures, and an illustration of their operation in the establishment of a call connection will be described presently.

In the hierarchical architecture, connection management is entirely controlled by the level 3 processor (SCPU) common control element (see FIG. 1). A connection is established when a call request (CR) packet is received, according to the following procedure. A CCB is allocated and linked to the LCB of the input/source line; specifically, to the LCB's logical channel identified in the CR packet header. An output line is then selected by using the called address and the routing table. The selection process calls for checking the line availability and the logical channel availability of each candidate line, to make the "best choice". The CCB is linked to the selected output/destination line LCB (and LCN). The output LCN is then inserted into the CR packet header, and the packet is sent to the mailbox of the level 2 processor which controls the output line (destination side).

The linkage defining this connection is illustrated in FIG. 3. During routing and call setup, the linkage must be established. A CR packet 22 arrives across the source side transmission line associated with LCB 25. The CR packet is received and delivered by levels 1 and 2 processes, which is the extent of their function and then the level 3 process takes control. Level 3 uses the information obtained from level 2 regarding the line and logical channel on which the packet was received, and performs the appropriate routing using its routing table. The address identifies a user number, which is to be routed to a destination side line in this switch. The routing table identifies that line from the address, and hence, the routing. Level 3 must then look into the LCB 28 of the identified destination side line to ascertain whether the line is both up and available. If both of those conditions are satisfied, level 3 finds an unused LCN and allocates it, by writing into it, indicating that channel is now being used, and allocates a CCB 26 for linking the two LCBs. After being established in this manner between source and destination, the connection enters the "data transfer phase".

For the duration of the call connection in that phase, all data packets received from either direction (source or destination side) are switched to the other side (the output side) using the input line and packet header LCN to trace the linkage to the CCB and output LCB and to replace the input LCN with the output LCN for the next switch to repeat the process.

In the hierarchical architecture illustrated in FIGS. 1 and 2, the connection is established and the switching is performed by a single element, the SCPU, with a consequent major drawback that all connections are vulnerable to a failure of this level 3 processor, with no possibility of establishing new connections. A further disadvantage is that total switch performance is limited by the number of packets the level 3 common control element can process in a given time interval, and since X.25 level 3 processing (by way of example) is about 10 to 20 times less than level 2 processing, then for a given technology the maximum switch size would run approximately twenty fully loaded line cards.

Another significant drawback of the hierarchical scheme is the inefficiency associated with a requirement of repeated copying of each packet from one memory bank to another in each packet switch. In the system of FIG. 1, the incoming packet is first copied into the applicable input LPM level 2 processor 16. Then the LPM copies the same packet into global memory SSU 10, and puts it in a mailbox so that the SCPU level 3 processor 14 can read it and insert the output data structure. Then the SCPU processes the packet, and puts it in the output LPM's mailbox on the SSU. Thereafter, the output LPM must copy the same packet into its local memory for transmission over the output link. Thus, each packet is copied three times in each switch.

In the MSB architecture connection management scheme, the level 1, level 2 and level 3 processing is identical to that of the hierarchical architecture, except for certain aspects described below. However, various inefficiencies are introduced which do not exist for the hierarchical architecture and which severely limit MSB architecture usefulness. In MSB, the routing is typically performed at least twice within the device (box), because each card is an autonomous self-contained switch and an input line and an output line are generally located on separate cards in the device. In theory, switching may be performed an infinite number of times in an MSB architecture, which constitutes a "daisy chain" problem (discussed below).

All the connection management data structures (CCB, LCB, routing table) are kept in local memory on each card. The routing table on each card is unique to that card (i.e., a complete switch), and is very small since the switch system contains only the following lines: (1) local lines on the card; and (ii) trunk lines to each of the other switches (cards) in the bxx, which constitute virtual lines. As noted above, some implementations of this architecture use cables such as RS232 for interconnection, while other implementations use a shared medium such as a VME bus. In the present specification, trunk lines are defined as lines interconnecting switches internal to the network over which an optimized protocol is often used, whereas DTE lines (data terminal equipment, or subscriber lines), the other line type, are network entry lines over which a slower protocol is used to provide validation, error detection, accounting, and so forth.

The MSB architecture poses a network route generation problem for the NMS because of the sheer volume of routing tables—one for each card at each node. The route generation processing time, computer power requirements and management grows exponentially with growth of the number of switches in the network. Currently, most NMSs are designed to support several dozen to several hundred nodes. By way of example, an NMS capable of supporting up to 1000 switches would be of a size adequate for a global network of hierarchical switches which support ten to twenty line cards each, but even an NMS of that size would be grossly inadequate for an architecture where each card is a separate switch.

Routing of a CR packet is processing intensive. For example, the currently available TP4900 hierarchical architecture packet switch can switch from 10,000 to 15,000 data packets per second, on already-established call connections. However, it can only establish about 250 connections per second, in the absence of switching data packets. Routing may occupy up to 15% of all connection establishment processing, 60% on each transit node for each connection establishment. This disparity between the time and processing required for call connection and data transfer phase switching reflects the fact that the level 3 processor common control element must perform all of the additional processing at call setup.

A corresponding problem is encountered in the MSB architecture because of double routing inefficient real-time processing of subscriber traffic. In any multi-line card architecture, the normal routing case selects an output line which is controlled by a line card other than the input card. In the MSB architecture, where each card acts as a switch, the first card routes to an inter-card trunk line as the output line; the second card routes again, this time to a transmission line to another node in the network. Thus, in this architecture, the costly process of routing is performed at least twice. This is particularly unacceptable in network applications such as transaction processing, e.g., credit card verification or automatic teller banking, where there is no data transfer phase—merely many call setups with instant call clearing. It would therefore be highly desirable to perform routing only once for management of each call connection.

While double call routing is a significant problem which occurs for the normal case, under some less frequent circumstances an even more serious problem may be encountered in the MSB architecture. Specifically, a daisy chain route path may be established which can pass through multiple numbers of cards in the box. When this occurs, all packets of the connection are processed by each card on the daisy chain, resulting in duplicate processing, resource usage, and delay within one node (box). In fact, double routing is simply a special case of daisy chain routing.

As an example, daisy chain routing may occur when an MSB device has no available path to route a call request. When that happens, the affected device clears the pending connection back to the preceding device for that CR. The latter device's destination side card will then route the call over the next best path, which may be via a third card within the MSB device. FIG. 4 illustrates the problem in the MSB architecture. A CR packet is received by card 30, which routes it (as CR #1) over a virtual trunk line across CP (communication processor) bus 33, to card 32. Card 32 performs a second routing (constituting the double call routing problem) and selects a local trunk line, sending the CR out of the device. Subsequently, card 32 receives a Clear Request (CLR) packet back for that CR, because a node downstream (which may be a considerable distance away, geographically) has n path currently available to route this call. Card 32 then attempts to reroute the CR packet (as CR #2) via adjacent card 34, which selects one of its own local trunks to dispatch the CR packet. If a path exists to route the call to the destination, a call accept (CA) packet will be received back from the destination. The CA packet traverses first and second hops via cards 34, 32 and 30. Each hop involves the sending of a packet from one device to a second device over a bus, cable or other interconnection fabric between the two devices. This routing creates the daisy chain problem, because from that point forward, every data packet traversing the established call connection follows that same path through three cards.

The route generation problem is attributable to the existence of too many routing tables in the MSB architecture, where one routing table is provided on and unique to each card. For a robust network, more than one path, and ideally, several paths, should exist between source and destination. In the event that a line fails, the routing tables are structured to route the call through other switches. Such alternative paths may not be the best choice, but it is desirable that the routing tables should have that capability. Each routing table is aware of the status of the connecting lines to its card, but not of the status of the lines in or to other cards in the box. Hence, if a line is down, a packet may be routed in haphazard fashion because the routing table for each card will deal only with the status of lines directly connected to that card. In contrast, no such problem exists in the hierarchical switch architecture, because only one routing entity exists, at level 3, and that entity is aware of the status of all lines in the switch at al times.

Turning now to system administration in a packet switching device, the principal administrative functions are to perform as a network management system (NMS) interface for human operators, uploading of statistics/status/accounting collection, downloading of configuration information, fault detection and recovery, internal control of system configuration and statistics/accounting gathering. If a card fails, the system administration process has the capability to examine a configuration diagram and, from that analysis, make a switch to an appropriate backup card.

The methods of system administration used in the hierarchical and MSB architectures are the same in that every switching entity has one central element or process responsible for system administration. The MSB architecture, with its multiple switching entities, has multiple system administrators, each managing one component (one card). In the hierarchical architecture there is only one switching entity, and thus, each device has one overall system administrator. In the hierarchical architecture of FIG. 1, the system administrator is a common control element, MCPU 13.

At initialization, when the device is powered on, the card (one card in the hierarchical architecture, all cards in the MSB architecture) configured with administration (ADMIN) firmware makes a connection to the NMS to announce its existence and request downloading of initial configuration information. Upon receipt of the configuration information, possibly including a code load, ADMIN installs the software and configuration tables into memory and starts the system. In the case of the hierarchical architecture, this includes installation on other cards. The term "card" as used here is a simplistic reference to a subsystem which may consist of a main card and one or several daughter cards.

During initialization, a bootstrap ADMIN program must place a connection to the NMS to receive the system configuration information, and that program must then start the other cards in the system. In the hierarchical architecture, only the MCPU has the ADMIN software. The MCPU must access the NMS, notify the NMS of the network address of the MCPU, announce the need for software, and request an initial program load. The software is loaded, including executable code, data structures, LCBs, and then the system administrator repeats that process for all of the other cards, and subsequently commands them to start operating. In the MSB architecture, each card's ADMIN process performs this task, but only for its card.

For accounting and statistics reporting, processes in each protocol layer (i.e., levels 1, 2 and 3) send information to ADMIN either as a result of ADMIN polling the processes of each entity, or by simply periodically sending fixed information to ADMIN. ADMIN then places a call to the NMS and uploads the information.

For system reconfiguration, the NMS (human operator or computer) places a connection and sends commands to ADMIN, which interprets them and changes the configuration of the desired entity (e.g., takes a line out of service, changes subscriber line privilege,, or other action).

For fault detection, ADMIN periodically sends hello messages to each card, and assumes that the card has failed if it does not respond within a specified period of time. ADMIN can initiate recovery by reconfiguring the system and putting into operation a backup (spare) card in place of the failed card. This involves notification to the spare card as well as broadcasting the change to all other affected cards.

When an entire device fails (i.e., a system or node failure, caused by common control element failure, power outage, or the like) the adjacent devices only detect that the line(s) connecting to the failed device are down, and will respond by notifying the NMS of a line down condition. An NMS may deduce that a node has failed by observing that all adjacent nodes are reporting line down conditions for all lines connected to the device. Because all cards in an MSB architecture are line cards, each of which is a completely autonomous self-contained switch (device), in a network utilizing MSB machines the fault detection and recovery of line cards is the same as fault detection and recovery of nodes.

In fault detection and recovery, only the hierarchical system is of significant interest, for reasons noted below. In the limited context of this description the term "fault" means failure of the entire card. In the MSB architecture, there may be no explicit finding that a card has failed. Indeed, the only matter of significance at one card when another card fails is that the line (i.e., dedicated point-to-point physical line, or logical/virtual line over a shared bus) to the failed card (a stand-alone switch) is down and will be unavailable when routing is performed. The solution to card failure in MSB, then, and the implementation of recovery, is substantially the same as for failed devices (hierarchical or MSB) within a network. There is no real-time observation and switchover, which means that recovery will be slow. However, the impact of single card failure is not highly significant, either, because each switch is an autonomous, self-contained entity.

The centralized administration system in the hierarchical architecture is very efficient, but has the drawback that its failure will cause the failure of the entire system. Also, in a hierarchical architecture the administration system typically occupies a slot and requires a dedicated cost. The MSB scheme is more robust, simply because each card has its own administration system, but requires considerable overhead as a consequence of the number of devices communicating with the NMS, since each card establishes its own connections. As a connection is established in MSB architecture, each card performs full routing and allocates/creates a CCB (call connection block) to switch data packets during data transfer. As noted in discussing FIG. 4, processing activity takes place at three separate nodes, which is very time consuming and resource inefficient.

It is a principal object of the present invention to provide a new and improved architecture for packet switched digital communication systems, which overcomes the major limitations of the prior art classical hierarchical architecture and the MSB architecture.

Another broad object is to provide a flat, distributed architecture which enables a packet switch to more efficiently handle connection management and system administration.

SUMMARY OF THE INVENTION

The present invention provides an architecture which overcomes limitations of the prior art hierarchical and MSB architectures, in part by allocating universal (full functional) capability to each card or, more broadly, processor module (PM), as in the reliable MSB architecture, but using only a functional subset at any given time on any given PM, thus matching or exceeding the operational efficiencies of a fully operational hierarchical architecture. The invention includes a fully automated process for defining the subset of functions each PM performs at any given time, and the method of functional redistribution between PMs to adjust for operational changes such as self healing required during hardware failure. In the architecture of the invention, only the power supply and the central bus system can be characterized as common control elements.

The architecture of the invention, referred to herein variously as a flat communications processor (CP) architecture, flat distributed architecture or simply flat architecture, is implemented in a multi-card (multi-PM) system adapted to expand in real time. Universal flexibility is provided, and although a single PM packet switch may be operated, the benefits of the invention are obtained in systems having at least two PMs. All of the hierarchical architecture functions of the architecture of FIG. 1 are provided in the flat CP architecture, but, significantly, each of the universal PMs of the latter is capable of supporting all the functions within the switch system. Because there are minimal common control elements, the possibility of catastrophic failures caused by common control element failure is greatly reduced. Loss of traffic attributable to the loss of any PM in the system is limited to traffic routed over the lines connected to that PM. Moreover, a line card recovery system with "internal reconnect" is capable of saving connections transiting the failed PM even in those cases.

The flat CP architecture also avoids hidden performance limitations because the minimization of common control elements (an element which must process all subscriber data traversing the system) enhances the system throughput. Since the flat architecture uses a universal PM, it provides linear growth with the addition of such PMs. This simplifies system and field engineering, and reduces the need for system analysis, in that if system expansion is required and another slot is available, it is only necessary to add another PM. Manufacturing and inventory requirements are also simplified, because the architecture uses only one PM type.

The cost of the first port is reduced because even a single PM can provide a fully operational small switch, in contrast to the hierarchical system which requires several PM types (FIG. 1). Hence, the flat CP architecture is commercially competitive with MSB architectures for small configurations, and has growth potential of hierarchical architectures for large configurations.

MSB architecture has the performance inefficiencies of separate, unsynchronized devices for intercommunication, with network routing and switching performed fully an independently acting with each module. In contrast, the flat, distributed architecture of the invention routes and switches subscriber data from input (source) PM to output (destination) PM with the efficiency of a single switching entity (as with hierarchical) and interfaces to the network management system as a single entity.

In the preferred method and apparatus for performance of the method, the flat distributed architecture is employed in a packet switch to control the establishment of a requested call connection through the switch from one among a multiplicity of input transmission lines at which the call request (CR) is received to any one among a multiplicity of output transmission lines to the network of which the packet switch is a part. A plurality of individual PMs in the packet switch are interconnected by a shared transmission medium (e.g., interconnection fabric). Each PM is capable of controlling the routing of packets between any of its input lines and any output line of the other PMs, to the exclusion of the packet routing capability of those other PMs. The PM at which a CR packet is received is designated as the source PM, and the CR packet is processed within the source PM to build a message which includes information from the CR packet, to establish routing for the requested call connection through the packet switch.

Status of usage and operability of each of the output lines of the packet switch is information which is shared among all of the PMs. Using the shared information, the processor of the source PM selects an output line from among those available in the packet switch, to which the requested call connection will be routed. The PM having that output line is designated as the destination PM. Then the source PM establishes the call connection between the input line of the source PM at which the CR packet was received and the selected output line of the destination PM.

In building the message to establish the routing, the processor of the source PM allocates a connection control block (CCB) information data structure which is used to store linkages between the source PM and the destination PM. The CCB is linked to the line control block (LCB) information data structure associated with the input line on which the CR packet was received. Selection of the most appropriate output line for establishing the call connection is accomplished using a routing table stored at the source PM which identifies each candidate output line by its respective address in the packet switch (PM #, line #), and further, using criteria which includes the shared information on output line status and bandwidth availability for each candidate output line.

After the input line LCB is linked to the CCB, the CCB is linked to a virtual trunk line LCB on the interconnection fabric for the PMs in the packet switch, that connects the source PM to the destination PM. This use of a virtual trunk line is a significant aspect of the invention. The CR packet, the identification of the selected output line, and the identification of the virtual trunk line which connects the source PM to the destination PM are all incorporated into the connection-establishing message built by the processor of the source PM. The message is then delivered over the interconnection fabric (typically a bus) to the mailbox of the destination PM, and directs that the call connection be established to the selected output line, after verifying that the selected output line is still available.

If it is available, the destination side PM allocates a CCB and links it to the input virtual trunk LCB and the output line LCB. The CR is then passed to the output line level 2 process for transmission. No routing is performed on the destination side PM. If the selected output line is unavailable, the CR is cleared directly back to the source PM using the source PM/destination PM virtual trunk line, with notice that a different path is needed for establishing the call connection. This process takes into consideration the possibility that the output line status can change between the time the source PM makes the routing selection and the instant the output PM links a CCB to the output line.

The virtual trunk line concept of the invention permits all of the architectural simplicity of MSB which interconnects each "switch in the box" with other switches in the box via a dedicated trunk line, while maintaining the optimal performance of the hierarchical architecture. The virtual trunks are used for high speed switching to maintain packet sequence integrity in the distributed architecture, but cut-through routing which does not involve the virtual trunks is used in the time-consuming routing process. Virtual trunks are also used in system administration to declare a PM as having failed. If the virtual trunk line status is down, the active PM assumes that the remote PM is down.

BRIEF DESCRIPTION OF THE DRAWINGS

The above and other objects, features, aspects and attendant advantages of the present invention will become apparent from a consideration of the ensuing detailed description of a presently preferred embodiment and method of performance thereof, taken in conjunction with the accompanying drawings, in which:

FIG. 1 is a simplified block diagram of a prior art packet switch employing hierarchical architecture, described above;

FIG. 2 is a pyramidal diagram illustrating the nature of the prior art hierarchical architecture, described above;

FIG. 3 is a block diagram illustrating the prior art data structure linkage of a connection, described above;

FIG. 4 is a block diagram illustrating exemplary daisy chain routing in a prior art MSB architecture, described above;

FIG. 6 is a combined block and flow diagram illustrating the scheme for management of call connections in the packet switch of FIG. 5A FIGS. 7A, 7B and 7C are diagrams illustrating a virtual trunk configuration in a three PM packet switch system according to the invention, 7A being tabular as would be stored on each PM, and 7B and 7C being topological;

FIG. 9 is a highly simplified block diagram useful in explaining a system administration scheme of the invention.

DESCRIPTION OF THE PRESENTLY PREFERRED METHOD AND EMBODIMENT

Figure 5A:
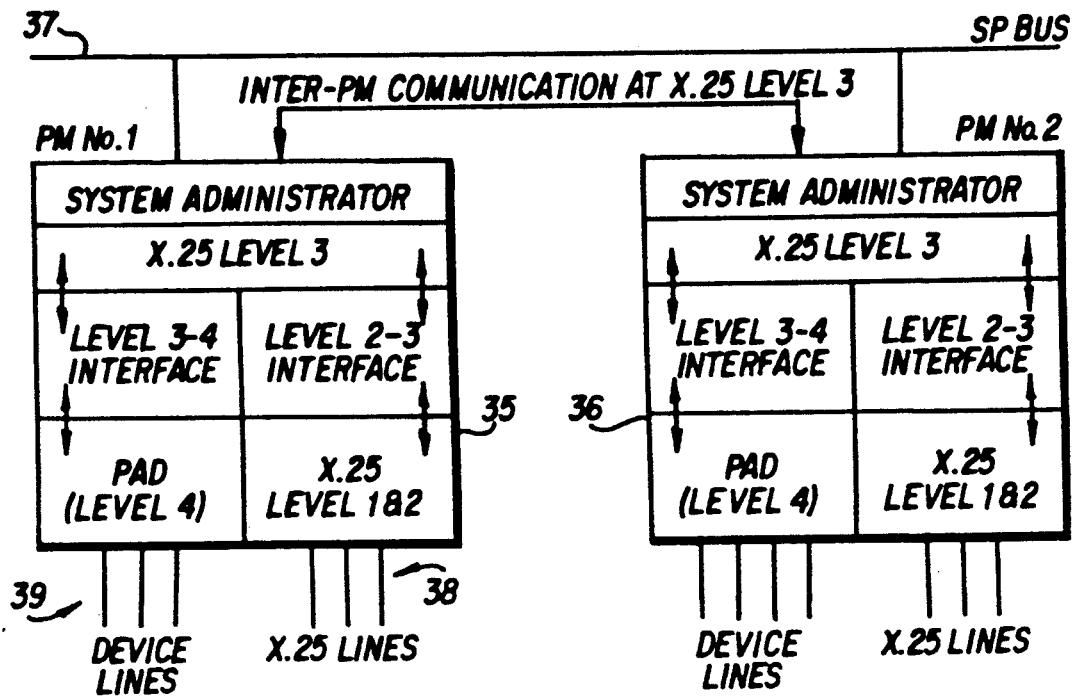
FIGS. 5A and 5B are simplified block diagrams of a preferred embodiment of a packet switch employing the flat, distributed architecture of the present invention, and of a PM.

A preferred embodiment of a packet switch employing the flat, distributed architecture of the present invention is shown in the simplified block diagram of FIG. 5A. The switch is illustrated for an X.25 environment by way of example and not of limitation. Each PM circuit card (hereinafter referred to simply as PM) 35, 36 of this exemplary switch system includes a conventional 32 bit processor and multi-megabit memory banks with buffer memory and local memory, and serial I/O (not individually illustrated). These components may be incorporated in individual semiconductor integrated circuit chips or embedded in a single chip on the card. The buffer memory is a multi-ported memory bank addressable by all of the PMs in the system (i.e., the packet switch). The address space is defined by the slot number of that PM in the card cage, along with a range of offsets. The buffer memories of all PMs form a contiguous block of memory which constitutes a distributed global memory for the packet switch. The local memory of each PM, which is addressable only by the processor of that PM, stores the code and local data structures. The processor and I/O control the transmission lines.

It is emphasized that the present invention is not concerned with the details of the individual PM or its components, all of which are entirely conventional. Rather, the invention resides in architecture, which is implemented in a multi-PM system such as, for example, the two PM packet switch and functional distribution illustrated in FIG. 5A. All hierarchical architecture functions of the prior art packet switch of FIG. 1 are available in the architecture of the system of FIG. 5A, but, significantly, each PM of the system possesses the capability to support all the functions within the switch. PMs 35 and 36 of this two-card switch (or of a multi-PM switch exceeding two, according to the invention) are identical, and each is arranged, configured and adapted to support levels 1 through 4 of the ISO/OSI model. The number of PMs may and probably would exceed two, but each packet switch array includes at least two PMs in the system of the invention.

Unlike MSB architecture, in the flat distributed architecture not all functions that must be performed are performed by each PM. Instead, the PMs cooperate to share the functional load. Each PM provides functional levels 1 and 2, level 3 which includes a system administrative function, and, in this example, functional level 4 (which, as noted earlier herein, is applicable only where a protocol conversion is required between level 3 and the transmission line(s)). Each PM also includes level 2-3 and level 3-4 interfaces.

The processor of each PM runs a multi-task operating system, with each of the functions of the PM implemented as tasks, scheduled by the operating system. The system administration functions of PMs 35 and 36 engage in intercard communication, at X.25 data (for example) level 3 in an appropriate internal protocol, via an interconnection fabric such as system processor bus 37 (an interconnection fabric which might alternatively be a banyan switching fabric, for example). The level 1 and 2 functions of the PM are coupled to X.25 transmission lines (38 for PM 35), and the level 4 PAD function has input and output from and to the device lines (39 for PM 35).

Figure 5B:
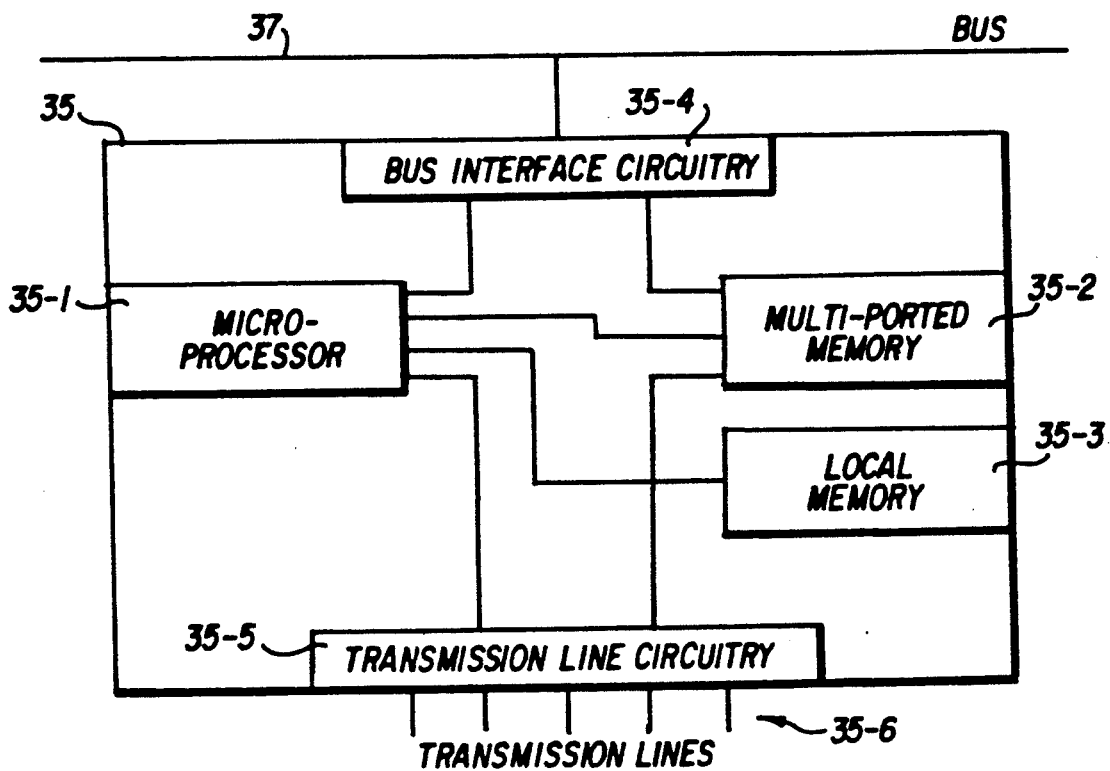

FIG. 5B is a block diagram of a typical PM, such as PM 35 of FIG. 5B, which may be employed in a packet switch with the flat distributed architecture of the invention. PM 35 incorporates a microprocessor 35-1 which performs the processing functions; a multi-ported memory 35-2 which is addressable from all PMs of the switch, and contains packets and LCB data structures; a local memory 35-3 which is addressable only from the local PM (here, PM 35), and which contains the CCB and routing table data structures, and the code for the system ADMIN functions, and for levels 2 and 3, and so forth; a bus interface circuit 35-4 which provides data (in its broadest sense) access to and from the bus 37; and transmission line circuitry which includes conventional DMA, serial I/O and the like for access to and from the transmission lines 35-6. The microprocessor is electrically connected to each of the other functional sectors of the card, while the transmission line and bus interface circuitry are connected to memory 35-2.

The internal protocol of most packet switching networks is connection oriented, to which the connection management aspect of the present invention is applicable. Some present-day networks utilize connectionless network protocols but it is anticipated that in the future, networks will be limited to the connection oriented protocol, with the advent of fast packet switching and B-ISDN (Broadband Integrated Services Digital Networks) standards.

While the flat CP architecture of the present invention is aided by advances in the technology to 32 bit microprocessors and large multi-megabit memory banks, in which or with which considerable amounts of address space are efficiently addressed, the invention does not lie in a mere substitution of such relatively new technology in an old architecture to improve speed. The hardware platform of the flat CP architecture assists in providing techniques which improve on the prior art architectures, with central control and elimination of redundant processing within the switch but without common control elements. The architecture is characterized as "flat" because each PM in the packet switch or switch array is equally capable of performing all protocol layer functions. Each of the multiple PMs or CPs is an autonomous self-contained level 3 entity which requires no assistance from another entity to perform routing and switching, and which has a global view of the status of all lines. For the data structures of the flat CP system, each PM contains LCBs for the lines local to the PM, and one virtual LCB for each virtual trunk line for connecting the local PM to other PMs. The local line LCBs are stored in buffer memory for access to all PMs. An LCB pointer table is stored at a fixed offset in buffer memory of each PM. Lines on each PM are numbered sequentially, and an LCB is accessed by any PM by indexing into the LCB table, using the line number.

The LCB (line control block), CCB (connection control block) and routing table data structures themselves are essentially the same as those used by the hierarchical and MSB architectures for connection management. Each LCB describes the characteristics of an associated input or output transmission line of the PM, contains the associated line ID, as well as line control information including line status (e.g., whether a line is available or is down) and LCN (logical channel number) status (e.g., whether the LCN is available or has been assigned), and provides a logic channel map. However, instead of being allocated at initialization time for each transmission line, as in the hierarchical architecture, the input line LCB is linked to a specific CCB allocated by the level 3 process. As in the prior art architectures, the CCB contains connection control information which provides a pointer to the source side LCB and LCN, and a pointer to the destination side LCB and LCN. The routing table is loaded into the PM at initialization time, and contains an entry for each network address, identifying one or more lines over which the switch can route calls/packets for the specified destination address.

Examples of the LCB, CCD and routing table data structures are illustrated in tables 1, 2 and 3, respectively.

TABLE 1

| LCB Data Structures in Multi-Ported Memory of PM | |
|---|---|
| Memory Bank Address (offset) | |
| 0 | Pointer to LCB Table (value = 100) |
| 1 | |
| 2 | |
| 3 | |
| . | |
| 100 | Start of LCB Table (pointer to LCB 1,0 - value = 500) |
| 104 | Pointer to LCB 1,1 - value = 750 |
| 108 | Pointer to LCB 1,2 - value = 2000 |
| . | |
| . | Start of LCB 1,0 data structure |
| 500 | Line status - value = 1 (line is up) |
| 501 | Maximum available bandwidth - value = X |
| 502 | Average bandwidth in use during current time sample - value = X − Y |
| 503 | Logical channel map start - channel 1, value = 0 (avail.) |
| 507 | Channel 2, value = local memory address (pointer to a CCB) |
| . | |
| 551 | End of logical channel map |
| . | |
| 750 | End of LCB 1,1 structure |

TABLE 2

| CCB Data Structure | |
|---|---|
| Local memory bank offset | |
| . | |
| 2500 | Start of CCB associated with line 1,1 channel 25/ line 3,33 channel 10 |
| 2501 | Source side line #     value = 1 1 |
| 2502 | Destination side line #     value = 3 33 |
| 2503 | Source side channel #     value = 25 |
| 2504 | Destination side channel #     value = 10 |
| . | |
| . | Other parameters |
| . | |
| 2550 | End CCB |

TABLE 3
Routing Table

| Local memory bank offset | |
|---|---|
| . | |
| 5000 | Start of routing table |
| 5001 | Network address ABC |
| 5004 | path 1    value = 45 (PM #4, line #5) |
|  | path 2    value = 21 |
|  | Network address XYZ |
| 5009 | path 1    value = 49 |
| 5010 | path 2    value = 31 |
| . | |
| . | |
| 7000 | End routing table |

When a CR packet is received at the level 3 switch layer, a CCB is allocated and linked to the LCN of the LCB of the input/source line identified in the CR packet header field. Here, however, an output line is selected not only by using the called address and the routing table but by use of the shared global memory of all PMs to determine the best choice among all output lines of all PMs. The allocated CCB is then linked either to the selected output line LCB and LCN of the source side PM, if that was the best choice, or, more likely, to the LCB associated with a virtual trunk line to a destination side PM which has the output line that was selected in this process as the best choice. The output LCN is inserted into the CR packet header, and, if the selected output line is on a different PM, the CR packet is dispatched to the mailbox of the destination side PM via the virtual trunk line.

The level 3 process on the destination side PM then looks into the LCB associated with the designated output line to verify that it has not failed or become unavailable in the interim. No routing is performed at the destination side PM, however, because all of the routing has been designated by virtue of the selection of best available output line made at the source side PM using a global observation of all available output lines and their respective parameters or attributes on all PMs (including itself). Level 3 proceeds to allocate the designated LCN by writing into it, and the thus-established connection between source and destination enters the data transfer phase. For the duration of the call connection, all data packets move in the appropriate direction through that path, from original source to original destination or vice versa. If the selected output line is unavailable or is down, the destination side PM clears back to the source side PM to initiate a new output line selection process.

It will be observed that although the CCB, LCB and routing table data structures serve the same basic purpose in the flat CP architecture as in the hierarchical and MS architectures, the linkage process is different. Only one routing table exists in the switch, but each PM maintains a duplicate copy of it locally. This allows each card's layer 3 functions to autonomously perform routing, while preserving the benefits of connection control decision-making with a global/centralized view of the entire switch/box. An important aspect of the architecture is that each PM performs routing only for calls for which it is the source side PM (i.e., where the CR packet is received on one of its input lines). The virtual trunk lines are not used in the routing process, but only in the linkage and switching process, and the routing table has no entries for the virtual trunk lines.

Thus, the three data structure types—LCBs, CCBs and routing table—are present in the flat CP architecture, and an LCB always exists for each line. Comparing the data structures and routing in the flat CP architecture of the invention versus the prior art hierarchical and MSB architectures;

TABLE 4
Architecture Comparisons

| FLAT CP | MSB | HIERARCHICAL |
|---|---|---|
| Each PM has a routing table. | Each PM has a routing table. | Only one unique central PM has a routing table. |
| Each routing table has view of entire system (status of lines on all PMs). Each PM has an identical routing table except in momentary instances during network routing updates. | Each routing table is unique for the specific PM (only status of lines controlled by that PM are present). | The routing table has a view of entire system (status of lines on all line card PMs). |
| Only source PM performs routing decision. Destination PM either accepts routing decision or clears back to source PM. | Source PM, and each transit and destination PM perform routing. | Only unique central PM performs routing. If line processor clears back, central processor must perform reroute. |
| Each PM stores LCBs for each line it controls, and for virtual trunk lines to other PMs. Other cards may read status of LCBs of real lines but cannot write into LCB. | Each PM stores LCBs for each line it controls, and for PM interconnect trunks. A PM can only read and modify (write) status of LCBs it controls. | All LCBs stored on a central module and controlled by a unique processor. No other card can read/-write into into LCBs. |

In the hierarchical architecture, only the SCPU, a level 3 element, sees all three data structures, and only one routing table exists. All of the data structures may be stored in the SSU or the SCPU—the particular location is not important. The CCBs are entirely controlled by level 3. In the MSB architecture, each PM has only the local line LCBs, with virtual lines to other PMs. Each PM has a unique set of LCBs and a unique routing table, because each PM controls a unique subset of lines of the overall system.

Referring to the combined block and flow diagram of FIG. 6, the above-described procedure for establishing a call connection in the flat CP architecture is encompassed in the following six steps which constitute the algorithm or pseudocode. The processing is performed by the functional distribution of the multi-PM packet switch illustrated in FIG. 5.

1: Levels 1 and 2 functions 40 receive the CR packet 41 and send it up to level 3 (switch layer) process 43. This takes place on the source side PM 45, i.e., the PM which originally receives the CR packet on the side of the network from which the CR packet originated.

2: Source side PM 45 level 3 (43) allocates a CCB data structure 46 and links it to the input line LCB data structure 47. The input line is a local line of the source side PM 45 on which CR packet 41 was received and with which the linked LCB is associated. From this step on, all processing is performed by source side PM 45 level 3 (43), unless otherwise noted herein.

3: Routing is performed by source side PM 45 to select the best choice for the output line. A routing table 48, which is a duplicate of the only routing table in the overall packet switch, is stored in local memory of the PM and identifies each candidate line among all of the output lines of all PMs of the switch by the card slot number and the line number. The best choice of an output line to establish a call connection for this particular CR packet 41 is determined by parameters such as line status, bandwidth availability, and LCN availability. This information is found in the LCB associated with each candidate output line.

In step #3, the ability to route on the input PM instead of a common control element is an MSB architecture feature, but the ability to examine the status of and route to all lines in the box is a hierarchical or centralized architecture feature. The flat CP architecture enjoys the benefits of both. The routing decision is made at the source side PM based on an observation of all lines in the system and selection of the best available line, without need to consider the status of virtual trunk lines. The resulting advantages far outweigh the need for additional multi-ported memory on each card for LCB storage.

4: If the best choice for the output line is local to the source side PM 45, the rest of the connection establishment is similar to that for the MSB and hierarchical architectures, with linkage of CCB 46 to the LCB 49 associated with the selected output line 50 following the determination 51 that the best choice made by the routing table 48 is on the same (i.e., the source side) PM. However, if the selected output line is on a different PM, the CCB 46 is not linked to an output line LCB 49 of the same PM, but instead, to the LCB 53 of the virtual trunk line 54 (shown in phantom) connecting the source side PM 45 to the destination side PM 55 (i.e., the PM having the selected output line from the packet switch for establishing the call connection).

In step #4, it is unlikely in a large system (i.e., a many-PM packet switch) that the best choice will be found to be an output line on the source PM. Therefore, it is undesirable to seek to optimize for that possibility. Just as in MSB, the flat CP system has a virtual trunk line associating the PMs, and routing is performed on the source side PM, and if it is determined that the output lines nn the source side PM are inappropriate, a connection is made to another PM via a virtual trunk line. Significantly, however, and unlike MSB, during the routing step the system utilizing the flat CP architecture of the invention takes note of the status of the candidate real output line on the other PM, and in making the output line selection, assesses whether that line is up (not failed), available and has logical channels available. Thus, the reason for choosing to route over a virtual trunk line is not simply because the virtual trunk line is available, as in MSB, but because a real transmission line is determined to be available on a distant PM (one or more PM cards removed from the source side PM).

This considerable advantage exists because the flat CP architecture has the capability to make a global assessment of the availability of all potential lines right through to the final destination before any routing decision is made. Although the pure hierarchical architecture has a slight efficiency advantage over the flat CP architecture which requires a double linkage involving the virtual trunk line (not to be confused with double call routing), the flat CP has no common control elements and, consequently, none of the problems associated with them.

Each PM has a virtual trunk line LCB pointer (lookup) table 57 in its local memory, and each entry in that table has a loose association with an entry in the corresponding table on one other PM in the system, similar to the association of the two LCBs on opposite ends of a physical link, where each LCB is on a different node. In both cases, the local routing functions cannot examine the LCB on the opposite side of the link, but the line status and LCB allocation is synchronized. For that reason, each PM's virtual LCB lookup table and LCBs are kept separate from the real ones and are stored in local memory (not the globally accessible multi-ported buffered memory). The virtual trunk line LCB associations among PMs within the flat CP architecture are illustrated in FIG. 7, which will be discussed presently.

5: The CR packet is then put into a message by the source side PM 45 and sent to a mailbox 59 in the multiported buffer memory of the destination side PM 55. The message also contains the routing, including the identification of the actual output line that was selected by the source side PM 45, and the virtual trunk line ID which allows the destination side PM to identify the source side PM.

Step #5 of the call connection establishment procedure of the flat CP architecture differs from the analogous hierarchical architecture process in that the mailbox used in the former is located in the destination PM, not in the SSU common control element as in the latter. This step also differs from the MSB, in that the routing, including identification of the real output line to be used, is contained in the message, thereby eliminating the need for further routing by another PM. Part of the message dictates that no routing is to be performed, but that the destination side PM should simply link the message containing the CR packet to the identified output line for shipment from the packet switch. No further routing for this call is performed by the destination side PM even if the status of the designated output line changes, or a clear back is received for the call. The clear request is simply sent to the source PM to initiate rerouting the call.

The destination PM merely verifies the status of the output line identified by the source PM routing, and performs the linkage to the output line. Double linkage must be performed, however, on the source and destination PMs. A single linkage of the input LCB to CCB to output LCB is not performed entirely on the source PM because it could create a race condition.

Contention occurs when two or more PMs route a call to the same line and select the same output LCN, and simultaneously attempt to link their CCBs by writing to the same memory location. A race condition occurs when a level 3 entity links a CCB to an output LCB between the instants of time that a second PM selects the same LCN in the same LCB and the connection is sought to be linked. Contentions and race conditions are reconciled in the prior art schemes by use of highly sophisticated and complex measures such as special synchronization schemes.

By comparison to the sophisticated schemes required for resolution of a contention or a race condition, a double linkage required to be performed by the source and destination PMs in the flat CP architecture is relatively simple. Any PM in the packet switch can read the status of the LCB associated with any output line in the system, but only the local PM can write to the output line LCBs. Hence, contention is eliminated because linkage to the output line is performed by only one processor—that associated with the destination PM (or the source PM in the unlikely event that the selected output line is on the source PM). Furthermore, CR packets are shipped by the source processor over a virtual trunk line dedicated for use only by the source/destination PM pair. While a race condition can still occur between two source PMs routing to the same destination PM where only one channel is available, this is detected by the destination PM which thereupon establishes the connection for the first request and clears the second request back to its source PM. The source PM for the second request must then make a further global assessment to determine the next best choice from among the remaining output lines (i.e., those which are then-presently available). As seen in step #6 below, the destination side PM verifies the availability/operational status of the output line, which was selected by the source side PM using look-ahead routing (i.e., looking ahead of the virtual trunk link), before the destination side PM makes the linkage from the CCB data structure to the LCB and LCN associated with that output line. This simple scheme takes advantage of source and destination PM cooperation and the fact that a PM knows when it is acting as a destination side PM for a given call connection (because the input line to the latter PM is a virtual trunk).

Like the flat architecture, the hierarchical architecture also has race condition problems, but not contention problems. Contention problems are avoided because only one centralized layer 3 entity in a switch controls all the LCBs and call routing, including all reading and writing. The MSB architecture also avoids contention problems, because each card is a separate switch entity which controls the local lines and performs its own routing for each packet, but, as noted earlier, the architecture suffers from serious double or daisy chain routing and switching problems.

6: The destination side PM 55 level 3 process 61 allocates and links a CCB 62 (FIG. 6) to the virtual trunk line LCB 63 (which is the source line from the perspective of the destination PM), identified using the source side PM ID contained in the message placed in mailbox 59. Next, the output line status is checked by the destination side PM level 3 process 61. If the identified output line is still available (no race condition has occurred), the CCB 62 is linked to its associated LCB 65, and given to level 2 associated with the output line for transmission to the next node. If the output line is not available (e.g., a race condition has occurred since the source PM performed the routing), the destination side level 3 performs normal clear processing back to the source side PM for rerouting the call.

In step #6, the first half of the linkage is of the CCB to the input line, i.e., the input line is the virtual trunk, and the second half of the linkage is of the CCB to the output line, which is the real output line of the entire switch. This completes the double linkage. The normal clear processing referred to is in state P3 as defined by the CCITT X.25 state machine. The clearing cause/diagnostic will indicate "no path to route call", which is used in connection oriented networks to notify the preceding node (here, the source side PM) to try an alternate path. The destination PM for a particular call connection never performs routing or rerouting for the connection. In effect, it performs as a slave PM, and defers to the source side PM for activities such as rerouting and reconnecting. Any given PM in the packet switch may act as a source side entity for some calls, and as a destination side entity for other calls.

The virtual trunk line interconnection scheme of the present invention is used for inter-PM communications within a packet switch. Although the original MSB architecture physically interconnected the processor modules within the box/device, subsequent more advanced MSB architectures replaced the physical interconnections with a bus. However, only level 1 of a switching entity was aware that the point to point lines had been replaced by the bus, and higher layer processing was still based on the assumed existence of physical interconnections.

Similarities and differences between the virtual trunk line interconnection schemes of the flat CP and MSB architectures will be clarified by FIG. 7, which includes an example of the logic flow of connection establishment and switching using the virtual trunk line scheme of the present invention in a three PM packet switch. Each virtual trunk line must have an ID, and must be known to be a virtual trunk line. Unlike the MSB architecture in which the "virtual" lines are actually contained in routing tables, the virtual trunk lines in the flat CP architecture are not directly involved in the routing process, but only in call path linkage. The routing table for a switch includes only information regarding all real lines on all PMs of that switch. The virtual trunk line LCBs are internally generated, and completely transparent to the network management system configuration process. In all three parts of FIG. 7, all of the inter-PM pair virtual trunk lines are arbitrarily designated by the same line number, "33", for the sake of illustration in the examples to be discussed. Any number exceeding the maximum number of real lines per PM could have been chosen for the designation instead.

Figure 7A:
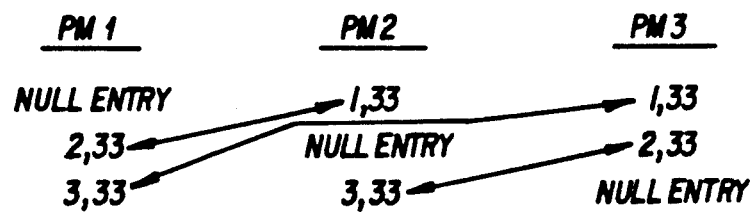
Figure 7B:
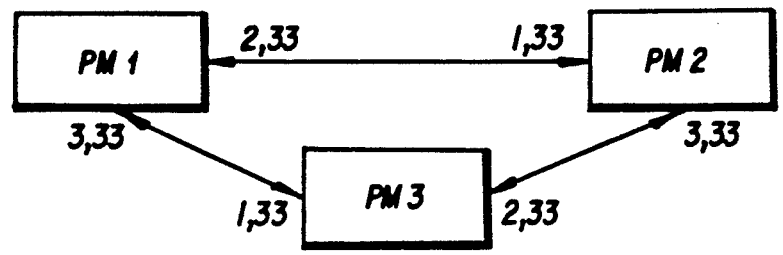

Lines are identified in FIG. 7 in the classical manner, by using two parts to the identification. The first part is the PM number, and the second part is the line number on that PM. In the case of the label "2,33", for example, the "2" portion means (from) PM 2, and the "33" portion means (on) virtual line 33. The topological diagram of FIG. 7B shows that in a three PM switch system there are three virtual trunk lines, two for any given PM.

The tabular form, shown in FIG. 7A, displays the same association, reflecting the manner in which a software lookup table is structured on each of the PMs. A null entry takes place when both the input line and the selected output line are on PM I (i.e., the source side PM and the destination side PM are one and the same PM, because the best choice of available output lines is on the source PM, here 1). This is because when the selected output line is on the source side PM 1, there is no need for an inter-PM pair virtual line linkage from PM 1 to any other PM of the packet switch. The same null entry occurs when PM 2 is the source side PM and selects one of its own output lines, since virtual lines 2,33 (i.e., from PM 2 on line 33 to each of PMs 1 and 3) are not utilized here in the establishment of a call connection. Similarly, a null entry exists for virtual lines 3,33 when PM 3 is both the source and the destination PM for a call connection. This is shown in FIG. 7A. FIGS. 7A and 7B also show the relationship between virtual lines for each pair of PMs, namely, that in the case of PM 1, for example, line 2,33 (i.e., from PM 2, on virtual line 33) is identical to line 1,33 (from PM 1, on virtual line 33) for PM 2. The only difference is that PM 2 is identified as the source PM in the former, while PM 1 is identified as the source PM in the latter.

Figure 7C:

Referring to FIG. 7C, when the level 3 process of PM 1 routes a CR packet from input line 1 of PM 1 (which is therefore the source side PM since the CR packet to this packet switch originated as an input to PM 1) to a output line 1 of PM 3 (which is therefore the destination side PM since the call connection is routed to one of its output lines, absent a finding of unavailability on attempted verification and a clear back to PM 1), the following actions will take place:

- PM 1 links its LCB 1 associated with the input line on which the CR packet was received to the source side of the CCB data structure allocated by the level 3 process of the PM, and links its LCB 3 associated with virtual trunk line 33, which is stored in local memory, to the destination side of the CCB.
- PM 1 sends the CR packet in a message to the mailbox of PM 3. The message contains the packet and identifies the input line as virtual trunk line 1,33 (i.e., from PM 1, on virtual line 33) and the selected output line (here, 3,1).
- PM 3 removes the packet from the message, allocates a CCB, links it to the LCB for the input local virtual trunk line 1,33, links the CCB to the output LCB (identified by the output line ID contained in the message), and sends the CR packet to the PM 3 level 2 process for that output line.

In data transfer, when sending packets on this virtual circuit (connection) to PM 1, PM 3 builds messages to PM 1 containing the input packet that PM 3 receives from the user at the destination (recall that "destination" in this sense simply refers back to the opposite end of the call relative to the user which originated the call (the "source"), and that each end may and usually will transmit data to the other), and further identifying the virtual trunk line linking the two PMs in this switch as 3,33. PM 1 sends its input packets from the "source side of the connection to PM 3, in messages identifying the virtual trunk line linkage as 1,33.

The call connection management method which has been described provides packet switches having the flat CP architecture with per call processing efficiencies approaching those of switches having hierarchical architecture. A significant aspect of the invention is that multiple routing and switching entities (level 3s) are allowed to operate simultaneously using shared resources without a complicated synchronization scheme.

Figure 8:
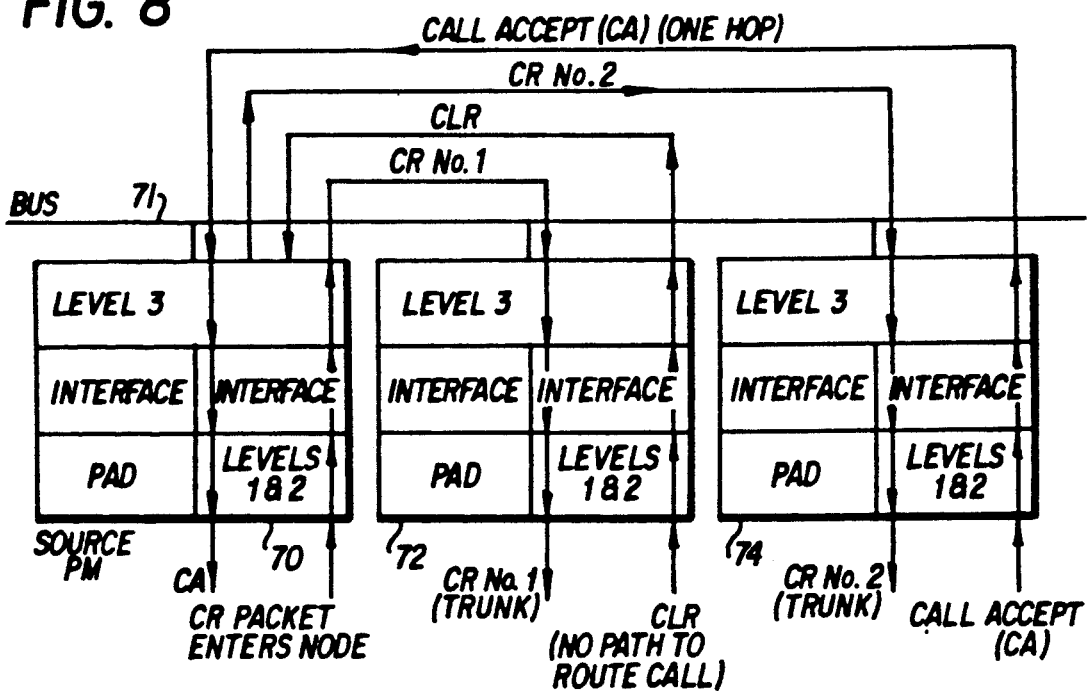
FIG. 8 is a block diagram of a packet switch according to the invention, illustrating a solution to the daisy chain problem.

By designating the source PM as the active component for race condition resolution, the flat CP architecture eliminates the daisy chain problem suffered by the MSB architecture. Referring to FIG. 8, the problem is solved, in essence, by ensuring that the path for each call traverses only two PMs of any multi-PM packet switch (i.e., one inter-PM hop, where a "hop" is defined as the sending of a packet or a message from one PM to another PM of the same packet switch over the interconnection fabric shared by all of the PMs of the switch (i.e., the shared transmission medium)). In the Figure, the CR packet enters the node (i.e., the packet switch) at a PM 70, which consequently becomes the source side PM for this call request. PM 70 forwards a message containing the CR packet (referred to in this part of the example as CR #1) over a virtual trunk linkage of the interconnection fabric (bus 71) to a destination side PM 72 which has the output line that was selected in the routing process by PM 70 as the best choice among all of the available output lines of the overall switch. In attempting verification, PM 72 determines that the designated output line is no longer available (for whatever reason), or after shipping the CR packet out, a clear back (CLR) packet is received by PM 72 from a distant node. PM 72 follows by dispatching a CLR packet to the source PM 70 to indicate no path is available to route the call.

Source side PM 70 then performs rerouting and forwards a message containing the CR packet (CR #2) to a PM 74 having the newly selected best available choice of an out put line for this call connection, and thus PM 74 is now the destination side PM. Of course, the newly selected output line might have been on PM 72 again (or on PM 70 itself). PM 74, after verifying the availability of the output line, ships the CR packet out. This time, a call accept (CA) packet is received by PM 74 from the destination end of the call and is returned directly to source side PM 70 on bus 71. All data packets transmitted from either end during the call connection will take this single inter-PM hop in their path through the packet switch depicted in FIG. 8. This advantageous result is accomplished by allowing only the source side PM to perform routing to the exclusion of all other PMs in the packet switch, and by the fact that the preceding node of notification purposes is always the source side PM in the flat CP architecture.

The flat distributed architecture of the invention is capable of establishing and clearing more call connections per second than either of MSB or hierarchical, making it particularly well suited for transaction processing, which currently may be the fastest growing applications of packet switching technology. Such applications include automatic teller machines, credit card validations, and stock quotations, to name a few, each involving connections which exchange a single or several units of information in each direction before being cleared and which must be established and torn down quickly.

In the system administration aspect of the invention, the scheme utilized in the flat CP architecture is as robust as MSB, while retaining the efficiency of a centralized administration system such as hierarchical. Each PM in the packet switch flat architecture can act as the system administrator of the packet switch, but only one PM may do so at any given time and during that time is designated as the "master PM". The master PM performs the same functions with the same basic algorithm as in the hierarchical architecture including software loading from the NMS, and system redundancy/reconfiguration/fault detection for PM failures.

Significantly, however, the algorithm used in the system administration scheme of the present invention allows the PMs of a given packet switch themselves to determine which of them will be the master PM and which of them will serve as a backup to the master PM (the "backup PM"). This algorithm also allows identifying the current master PM and when a switchover (from master to backup, or vice versa) has occurred. Functionally, the selection of the administrative modules is as follows: (1) an active (working, i.e., non-failed) PM with the lowest slot (address) is designated as the master PM; (2) an active PM with the next lowest slot is designated the backup PM; and (3) an active PM with the highest slot is designated as the "monitor PM" for the master PM. Just as each PM in the packet switch can act as the master PM, each can also act as the backup PM or monitor PM, but with only on of those functions at any given time.

The following algorithm is employed at PM initialization time (i.e., at power-up or reset of each PM) and provides the firmware/bootstrap logic:

Read slots below your (this PM's) slot address to search for active PM.
If found,
  Assume the PM so found is the master PM, and ask master for software download.
else,
Search for active PM above your slot.
If found,
  Assume that PM is the master PM and ask the master for a software download to render yourself capable of being the new master. Broadcast to all PMs your ID and that you are now master.
else, you are the only/first operational PM in the device Assume that the system is not operational and that you are the first PM to come up. Assume mastership and request initial software download from NMS.
You are now in an operational state. Read slots above you to search for an active PM.
If none is found,
. Assume responsibility for master PM monitor. Notify previously highest PM that you are taking over this responsibility.

FIG. 9 is a highly oversimplified block diagram which is useful for explaining some of the concepts involved in the system administration scheme. It is assumed in this example that the slot addresses of the PM cards range from the lowest for PM 1 to the highest for PM n. During initialization, the firmware on each of the PMs of the packet switch provides an operational state in which the active PM in the lowest slot address, PM 1 in this example, becomes the master PM for administration of the entire system of its packet switch. All of the other PMs in the packet switch are subordinate to the master. The active PM in the highest numbered slot, here PM n, becomes the monitor PM. PM 1 then performs in the same way as the system administrator in the hierarchical architecture—sending out "hellos" (greetings) to the other PMs in a round robin sequence, performing failure detection and recovery, and so forth—with the efficiency of the system administration in hierarchical. Of course, the master PM (and the backup and monitor PMs) also perform connection management and data transfer functions the same as all of the other PMs in the system.

Significantly, however, unlike the hierarchical architecture but as in the MSB architecture, failure of the PM performing system administration will not cause a failure of the entire system. Continuous operation is achieved in the scheme of the present invention by having PM n, which is the monitor PM in this example, send periodic "hello" messages (greeting inquiry checks) to the master PM. If the master PM fails to respond, the monitor PM immediately commands the active PM with the next lowest address, as the backup PM, to assume the system administration responsibilities. In the example of FIG. 9, PM #2 would become the new system administrator (the master PM) in those circumstances. The master PM detects failure of the monitor PM in a similar manner, and in the event of such failure would immediately command PM n-1 to assume this task.

With the above initialization algorithm, each PM commences at its start up to "look" at the overall switch configuration. Each PM knows its own slot address, and proceeds with observation from the lowest to the highest slot number through the list of addresses until it discovers an active PM. When the first active PM is found, and if that slot is a lower number than the observing PM's slot, the latter stores the slot number (address) of that first active PM as the master PM. The PM then requests the master PM for a software download at its own numbered slot.

The initializing PM may not find a lower numbered active PM, but cannot immediately assume in those circumstances that it is the master, because another PM may already have been designated as master PM. If, as it proceeds to scan through the higher numbered slots, it finds a higher numbered active PM which is currently the master, it then requests a software download from that master to render it (the initializing PM) capable of performing the system administration function. At the same time, it notifies the current master PM that it (the initializing PM) will assume the responsibility of system administration as soon as it comes up (i.e., completes its initialization and has its software loaded), because it is now the active PM with the lowest slot address as required by the algorithm for assumption of the master PM role. It then broadcasts this system state change to the other PMs via the system bus (or other interconnection fabric, such as banyan switching fabric, which may be used to interconnect the PMs).

The algorithm presently preferred for use by the system master PM to detect a PM crash (system/PM monitoring) is indicated below. When a failure is detected, the procedures customarily used in the hierarchical architecture may be used by the flat CP architecture of the invention as well.

While (forever)
  Using a round robin algorithm, find next slot with active PM. Wait for a time period X (X is a configuarable value which must be large enough to keep system monitoring overhead small, yet small enough to ensure prompt detection of a PM failure).
  Send hello message to next slot with active PM.
  Start response timer and wait for hello response.
  If response timer expires before response is received
    Assume the PM failed and initiate normal PM/slot failure procedures.
    If failed PM was monitor PM
      Notify the next highest PM that it is now monitor PM.
  else, the PM sent a hello response before timer expired.
    Turn off time and loop to top of this "while" loop.
END while loop.

The following is the preferred algorithm for use by the monitor PM to ensure that the packet switch system has an operational master PM.

While (forever)
  Wait for time period X (X is a configurable value which must be large enough to keep system monitoring overhead small, yet small enough to ensure prompt detection of a failure).
  Send hello message to master PM.
  Start response timer and wait for hello response.

If response timer expires before responses is received
  Assume the master PM failed and initiate master switchover procedures. Specifically, notify next lowest slot with an active PM that it is now system master PM.
else, the PM sent a hello response before timer expired.
  Turn off timer and loop to top of this "while" loop.
END while loop.

In any given time interval, whichever PM is the master will have slightly less throughput capability, because of its performance of administrative functions while simultaneously performing the switching, routing (in applicable circumstances, as discussed above in the connection management and establishment description herein) and other connection establishment/management and data transfer functions required of each PM in the overall packet switch.

The reduction in throughput of the master PM for information or packet processing is not a serious drawback until the system (the packet switch) exceeds twenty PMs (e.g., 160 ports). The latter capacity is an estimate based on typical functionality required in current industry-leading devices. As the number of ports of the packet switch increases substantially above that reference level, the master PM becomes essentially a dedicated system administration processor. Nevertheless, the flat architecture of the present invention has a redundancy capability—and its advantage of an efficiency equivalent to the hierarchical architecture, without the prospect of entire system failure if the system administrator fails, far outweighs the anticipated loss of throughput in the master PM. Of course, if the master PM (or any PM) were to fail, the lines on that PM would be lost, but this is a physical inevitability in any architecture.

The significance of traffic throughput reduction in the master PM grows with increases in the number of PMs in the system, because each new PM adds to the administrative burden of the master. To assist in reducing this strain, the above algorithms may be modified slightly to distribute the master functions over multiple PMs. An example of this is the following:
  the lowest and highest numbered active PMs are associated with master and monitor PMs for software loading and configuration functions;
  the second lowest and second highest numbered active PMs are responsible for master and monitor PM functions of accounting record consolidation and uploading to the NMS;
  the third lowest and third highest numbered active PMs are responsible for master and monitor PM functions of statistics and alarm collection and NMS reporting.
This distribution of system administration functions permits the flat distributed architecture of the present invention t grow to very large configurations.

It will be understood from the foregoing description that each time a new PM is inserted into the packet switch by initialization thereof, the new PM automatically evaluates its logical address in the array of PMs within the switch, as well as the relative logical address of each of the other PMs in the array, and, according to the programmed criteria (which includes logical address of the PM in the array), if it is the PM (or one of the PMs) designated to assume control of the principal administrative functions of the packet switch system (including such tasks as loading of software among the various PMs, redundancy of PMs, switch reconfiguration, and reporting to the NMS of such items as statistics and alarms), or to monitor the functionality of the PM(s) so designated, it promptly assumes such control. Otherwise, upon initialization and thereafter, the new PM maintains a passive role in system administration within the packet switch unless and until either the master PM or the monitor PM commands it to assume an active role because of a PM status change in the array.

While reference has been made on occasion herein to the application of an X.25 system, it will be recognized that the principles of both the connection management and the system administration aspects of the invention are applicable in general to any packet/cell based system.

Although a presently preferred method and embodiment of the invention have been described herein, it will be apparent from a consideration of the foregoing description by those skilled in the field to which it pertains, that variations and modifications may be implemented without departing from the true spirit and scope of the invention. It is therefore intended that the invention shall be limited only by the appended claims and the rules and principles of applicable law.

What is claimed is:

1. A flat, distributed architecture for a packet switch for use in a packet switching network, comprising:
  at least two switching/line processing modules (PMs),
  an interconnection fabric for communication between the PMs,
  each PM including:
    a plurality of input and output ports for transmission links between the packet switch and the network,
    means for implementing at least three layers of the ISO/OSI seven-layer protocol including level 1 physical layer which converts packets to and from the transmission signals of a transmission link, level 2 link layer which transmits and receives packets across the transmission link, and level 3 network layer which switches packets through the packet switch between an input transmission link at a source side and an output transmission link at a destination side of the packet switch for packet transmission, with reply communication from the destination side to the source side of the packet switch, the implementing means of each PM including:
      system administration processing means responsive to system initialization and to the absence of designated control of system administration to any of the other PMs, for assuming complete control of the system administration of the packet switch, including uploading and downloading of software to and from the other PMs of the witch and performing other administrative tasks, to the exclusion of all other switches in the array.

2. The invention of claim 1, wherein
  the system administration processing means of each PM includes:
    means for scanning the other PMs of the packet switch at PM initialization to determine whether any PM among them is currently responsible for the system administration tasks of the switch, and means responsive to a positive response to the scanning for foregoing said complete control, and responsive to a negative response to the scanning for assuming said complete control.

3. The invention of claim 2, wherein
the scanning means includes:
   means for making the determination of current responsibility for system administration at PM initialization based on the address of each PM in the packet switch, where the address is the sequential location of the PM relative to other PMs in the packet switch.

4. The invention of claim 3, wherein
the system administration processing means of each PM further includes:
   means for recognizing from said determination at PM initialization that no other PM scanned has a superior entitlement to perform the system administration tasks for the packet switch.

5. The invention of claim 4, wherein
the system administration processing means of each PM further includes:
   means for taking control of all system administration tasks for the switch in response to said recognition at PM initialization.

6. The invention of claim 1, wherein
the system administration processing means of each PM includes;
   means for accepting a backup role of system administration to a PM having been designated superior entitlement to exclusive control of system administration, to avoid a loss of administration in the packet switch in the event of failure of the PM having exclusive control thereof.

7. The invention of claim 1, wherein
the system administration processing means of the PM currently having exclusive control of system administration in the packet switch includes:
   means for scanning through the packet switch to locate active PMs,
   means for interrogating each successive active PM located in the scanning to obtain a response to the interrogation within a predetermined time interval as indicative of a working PM, and a lack of response within said predetermined time interval as indicative of a failed PM, and
   means for replacing a failed PM with a working backup PM.

8. The invention of claim 7, wherein
the system administration processing means of the PM currently having exclusive control of system administration in the packet switch further includes:
   means for repetitively reinitiating the scanning by said scanning means through the switch to locate active PMs.

9. The invention of claim 1, wherein
the system administration processing means of each PM includes:
   means for monitoring the PM that currently has exclusive control of system administration in the switch, to detect a failure thereof, and wherein
the packet switch further includes:
   means for selecting one of said PMs to perform the monitoring of the exclusive administrative control PM, to the exclusion of all of the other PMs in the packet switch.

10. The invention of claim 9, wherein
the system administration processing means of the PM currently performing exclusive monitoring of the PM having exclusive control of system administration in the switch further includes:
   means for repetitively interrogating the exclusive administrative control Pm to obtain a response to the interrogation within a predetermined time interval as indicative of a working PM, and a lack of response within said redetermined time interval as indicative of a failed PM, and
   means for replacing the failed exclusive administrative control PM with a working backup PM.

11. The invention of claim 9, wherein
the system administration processing means of each PM further includes:
   means for accepting responsibility for a backup role of monitoring the exclusive administrative control PM to the PM exclusively performing such monitoring, to avoid a loss of such monitoring.

12. The invention of claim 11, wherein
the system administration processing means of the PM currently having exclusive control of system administration in the packet switch further includes:
   means for observing the operation of the PM currently performing exclusive monitoring of the exclusive administrative control PM, to detect a failure of the monitoring PM, and
the packet switch further includes:
   means for selecting a backup monitoring PM to replace the failed exclusive monitoring PM.

13. The invention of claim 1, wherein
the packet switch further includes:
   means negating the exclusive control of system administration for distribution of system administration across at least two of the PMs of the packet switch.

14. The invention of claim 9, wherein
the packet switch further includes:
   means negating the exclusive control of monitoring for distributing the monitoring of the exclusive administrative control PM across at least two of the PMs of the packet switch.

* * * * *